US008405333B2

(12) United States Patent
Ni et al.

(10) Patent No.: US 8,405,333 B2
(45) Date of Patent: Mar. 26, 2013

(54) ACTIVE PULL-UP SYSTEM

(75) Inventors: Chuan Ni, Singapore (SG); Pauy Guan Tan, Singapore (SG)

(73) Assignee: Texas Instruments Incorporated, Dallas, TX (US)

( * ) Notice: Subject to any disclaimer, the term of this patent is extended or adjusted under 35 U.S.C. 154(b) by 531 days.

(21) Appl. No.: 12/688,619

(22) Filed: Jan. 15, 2010

(65) Prior Publication Data

US 2010/0289440 A1 Nov. 18, 2010

Related U.S. Application Data

(60) Provisional application No. 61/178,785, filed on May 15, 2009.

(51) Int. Cl.
*H02P 6/14* (2006.01)

(52) U.S. Cl. .................. 318/400.26; 713/300; 713/320; 713/323; 713/324

(58) Field of Classification Search .................. 318/599, 318/811, 400.26, 400.27, 400.06; 713/300, 713/311, 320, 323, 324; 700/82; 714/4.11, 714/6.3; 711/E12.053
See application file for complete search history.

(56) References Cited

U.S. PATENT DOCUMENTS

| | | | | |
|---|---|---|---|---|
| 5,627,460 | A * | 5/1997 | Bazinet et al. | 323/288 |
| 6,737,843 | B2 * | 5/2004 | Kanakubo et al. | 323/282 |
| 7,064,510 | B2 * | 6/2006 | Brannen et al. | 318/400.3 |
| 7,199,560 | B2 * | 4/2007 | Cheung et al. | 323/222 |
| 7,525,271 | B2 * | 4/2009 | Chen et al. | 318/434 |
| 8,286,018 | B2 * | 10/2012 | Chang et al. | 713/324 |

* cited by examiner

*Primary Examiner* — Antony M Paul

(74) *Attorney, Agent, or Firm* — Lawrence J. Bassuk; W. James Brady; Frederick J. Telecky, Jr.

(57) ABSTRACT

An active pull-up system for use with a motor is described. The active pull-up system comprises: a first resistor coupled to an output node; a first switch and a second resistor coupled in parallel with the first resistor, wherein the first switch is in series with the second resistor; a latch coupled to the first switch for either keeping the first switch open or closing the first switch in response to receiving a closing signal; and a threshold comparator coupled between the output node and the latch, wherein the threshold comparator transmits the closing signal when the output node exceeds a threshold value, which actively pulls up the output node.

4 Claims, 7 Drawing Sheets

ACTIVE PULL-UP SYSTEM

CROSS REFERENCE TO RELATED APPLICATION(S)

The present application claims priority to jointly owned U.S. Provisional Application corresponding to application Ser. No. 61/178,785 entitled "System with Active Pull Up Circuits." This provisional application was filed on May 15, 2009.

DESCRIPTION OF RELATED ART

With the evolution of electronic devices, there is a continual demand for enhanced speed, capacity and efficiency in various areas including electronic data storage. Motivators for this evolution may be the increasing interest in video (e.g., movies, family videos), audio (e.g., songs, books), and images (e.g., pictures). Cooling fan for CPU, GPU & ASIC have emerged as one viable thermal solution for cooling these device from overheat. Motors within these drives facilitate their effective operation, which may depend upon how the motor is driven. Motor designers may choose between focusing on the motor's current consumption during standby mode or the wake up time associated with driving the motor. Consequently, there remain unmet needs relating to driving motors within these cooling systems inside the digital systems.

BRIEF DESCRIPTION OF THE DRAWINGS

The active pull up system may be better understood with reference to the following figures. The components within the Figures are not necessarily to scale, emphasis instead being placed upon clearly illustrating the principles of the invention. Moreover, in the figures, like reference numerals designate corresponding parts or blocks throughout the different views.

Figure 1:
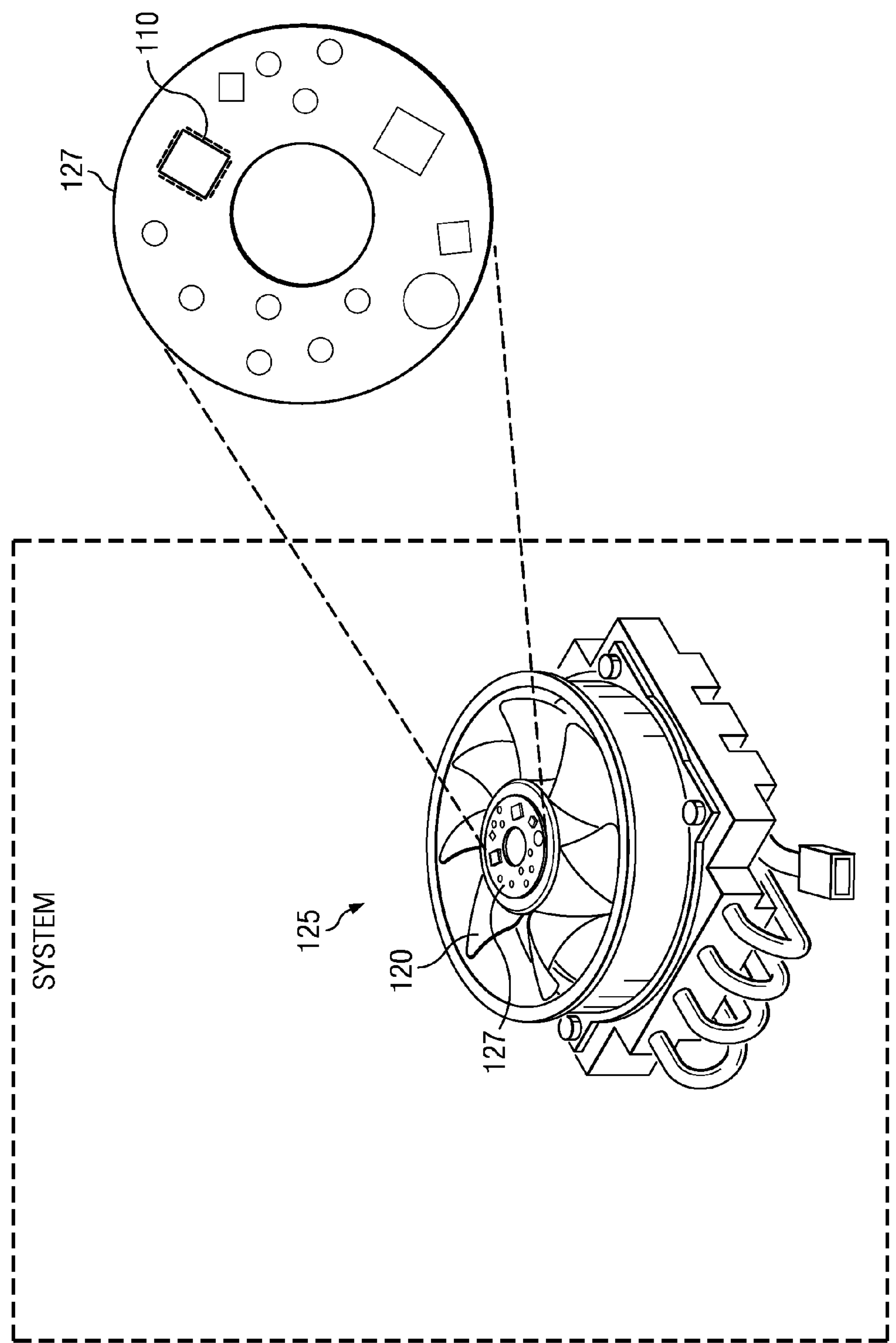
FIG. 1 is a block diagram of a system 100 that includes the active pull up system (APS).

While the active pull-up system is susceptible to various modifications and alternative forms, specific embodiments have been shown by way of example in the drawings and subsequently are described in detail. It should be understood, however, that the description herein of specific embodiments is not intended to limit the active pull-up system to the particular forms disclosed. In contrast, the intention is to cover all modifications, equivalents, and alternatives falling within the spirit and scope of the active pull-up system as defined by this document.

DETAILED DESCRIPTION OF EMBODIMENTS

As used in the specification and the appended claim(s), the singular forms "a," "an" and "the" include plural referents unless the context clearly dictates otherwise. Similarly, "optional" or "optionally" means that the subsequently described event or circumstance may or may not occur, and that the description includes instances where the event or circumstance occurs and instances where it does not.

Figure 2:
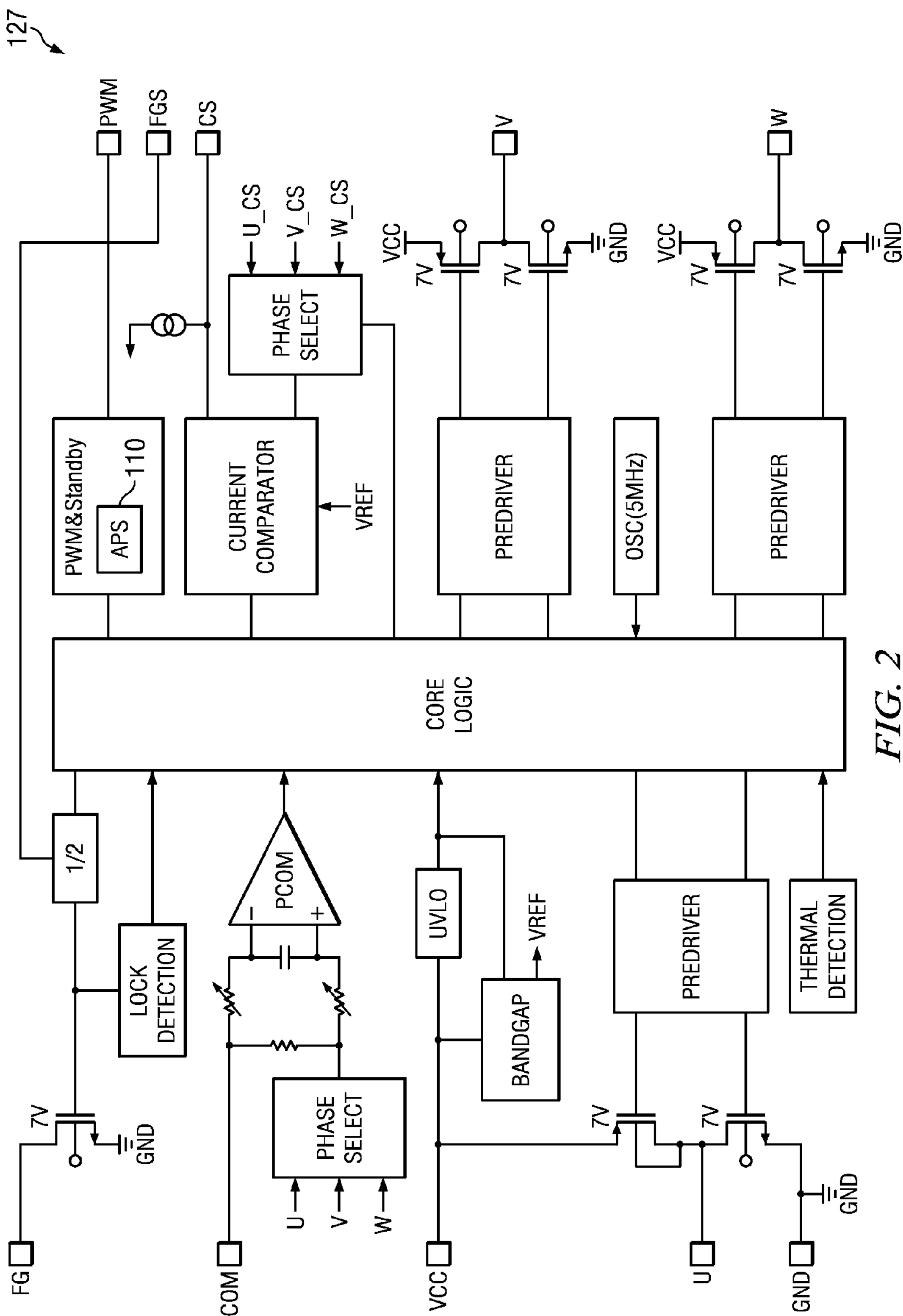
FIG. 2 is a block diagram illustrating the IC of FIG. 1.

FIG. 1 is a block diagram of a system 100 that includes the active pull up system (APS) 110. The system 100 may be any kind of system that utilizes a standby mode with low current, such as a computer system, portable computer system, or the like. When this system is a cooling system, it may include a fan 120 that cools a CPU 12*x*. The fan 120 includes a control board and corresponding integrated circuit (IC) 127. The active pull-up system 110 is a part of this IC. In an alternative implementation, the APS 110 may be included within the system 100 when it is a power tool, remote control toys, portable vacuum cleaner, or the like. Turning now to FIG. 2, this figure is a block diagram of the IC 127. At a high level, the IC 127 includes the following components: core logic block 210 that recognize the states the motor is in, thermal detection block 220 that regulates the temperature of IC 127. Together, these components provide speed regulation for the fan. In addition, the IC 127 includes a PWM & Standby block 230 that may control when the motor 125 enters or returns from a standby mode.

The APS 110 may be used in motor drive applications where an output node is pulled low for a long period of time. An alternative implementation may occur for non motor drive applications for any portable device with a sleep mode and active mode. This APS reduces current during the sleep mode and achieves higher communication speeds with the same pin by adjusting pull up resistance during active mode.

Figure 3A:
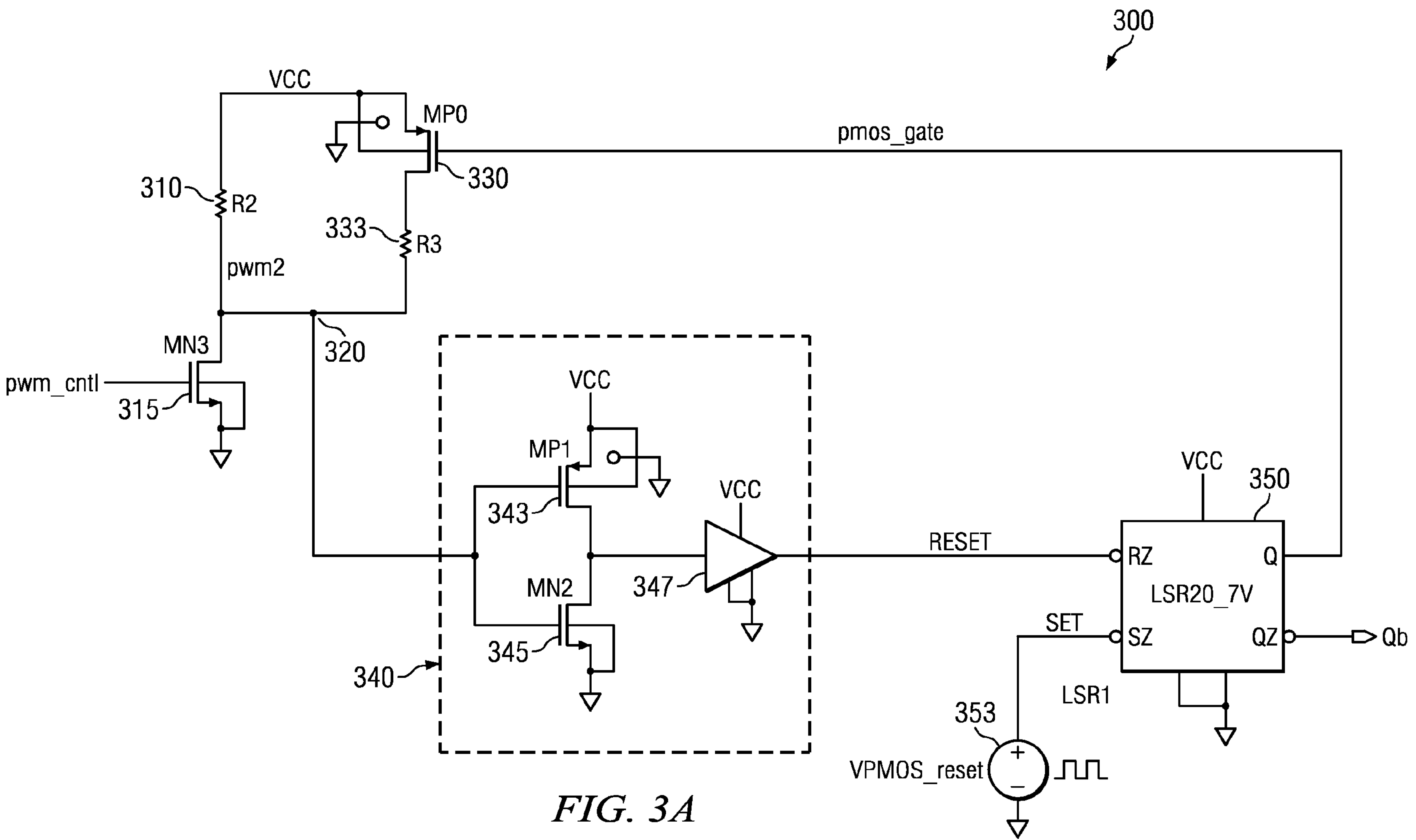
FIG. 3A is a circuit diagram for one implementation of the APS.

Returning to motor drive applications, one example may be when the motor 125 enters a sleep mode, which minimizes total current consumption and power consumption level. In these types of applications, the current on the pull up resistor is closely associated with the total current consumption of the device. In this APS, the resistance increases when the output node is pull low and the motor 125 enters a sleep mode. As the device exits the sleep node, the resistance in the APS 110 decreases. The output rising slew rate depends upon the resistance and capacitance at the output node. When external driving voltage drives the output node low, the output node will be driven close to ground. Hence, the output falling slew rate depends on the turn on resistance of the external driving transistor, the pull up resistance and the capacitance on the output node. Consequently, the APS 110 does not adversely affect either the rising slew rate or the falling slew rate. Other alternative implementations may occur that triggers the APS 110 by using any of the following different types of transitions: low to high transitions, high to low transitions, or some other type of digital pattern. Zone Name: A2,AMD FIG. 3A is a circuit diagram 300 for one implementation of the APS 110. This implementation includes a pull up resistor 310 (R2), which may have a resistance of approximately 2 MΩ, 1.3 MΩ, or the like, the quiescent current requirement during sleep mode determine the resistance value for 310, the higher the value, the smaller the quiescent current during sleep mode. This resistor can increase the voltage on the output node 320 (pwm 2) to a voltage close to the supply voltage $V_{cc}$. A switching device, such as the metal oxide semiconductor (MOS) transistor 315 (MN3), may decrease the voltage on the output node to a voltage close to a ground voltage. A control signal, such as pwm_cntl, for this switching device may come from an external device such as a Micro-Controller Unit (MCU). When the control signal is high, the switching device 315 closes and output node 320 is driven low. In contrast, when the control signal is low, the switching device 315 remains open and the resistor 310 can pull this output node high.

In addition to the resistor 310, the APS 110 includes a switch 330 in series with a resistor 333 (R3). This switch may be a MOS transistor and consequently denoted as MP0. The resistor 333 may have a resistance of approximately 50 kΩ, 400 kΩ, or the like, the selection of 333's value depends on the rising slew rate and current consumption during the active mode, the lower the resistance, the faster the slew rate and also a higher current consumption. When the 310 resistance is 2 MΩ, the current consumption is 2.5 μA at supply voltage of 5V, which is approximately 97.5 percent reduction, compared to a passive Pull Up schema that uses 50K resistance for 310.

The APS 110 also includes a comparator 340, which may be a threshold comparator. In one implementation, this comparator may include devices 343-347; an alternative implementation of the comparator 340 may include the following devices: voltage comparator with threshold level input. In one implementation, devices 343-345 may be complementary MOS type transistors. For example, device 343 may be a p-MOS transistor denoted MP1, while device 345 may be an n-MOS transistor denoted MN2. In contrast, device 347 may be a buffer denoted BU1G0 or the like. The device 347 differs from the devices 343-345, which arc arranged in a buffer configuration because this helps to reshape the comparator output to give a sharper rising and falling edges. Finally, the APS 110 includes a latch, which may be an SR-latch denoted LSR20. The set input on the latch 110 produces a high on the device 330, which disconnects it during the sleep mode.

The devices 330-350 collectively aide in actively pulling up the output node 320. An input to the threshold comparator 340 connects to this output node. This comparator's output is coupled to an input of the latch 350, such as a reset input. In contrast, this latch's set input is coupled to a voltage source 353 to represent a block of circuit that will set the active pull up, such as sleep mode detection circuit, or the like. When the output node 320 is pulled high by disabling device 315, the comparator 340 applies a low on the reset input once the voltage on the output node exceeds the threshold voltage of the threshold detection circuit: consists of 343 and 345. This turns on the switch 330 and connects the resistor 333 in parallel with the resistor 330. Consequently, the IC127 can enter an active mode.

As the control signal for the device 315 transitions from high to low, the APS 110 begins the active pull up detection. This transition disables the device 315 and the voltage on the output node begins increasing. The comparator 340 detects low to high transitions of the output node 320. Once this voltage is higher than the threshold voltage for the threshold comparator formed by 343 and 345, the device turns on, which applies a low to the input of the device 347. Consequently, the comparator applies a low to the reset input of the latch 353. The latch 350's output goes low due to the reset input being asserted, this turn on the PMOS and connects a smaller resistance R3 with R2 making the pull up stronger.

There are various components that are used in the active pull up scheme. A pull up resistor R2 provides the initial pull up resistance. It is usually large to minimize current consumption when PWM output node is pulled low during sleep mode. A switch MP0 in series with a resistor R3 was used to implement: this function. This branch provides a small resistance in parallel to R2 to increase the rising slew rate.

Figure 3B:
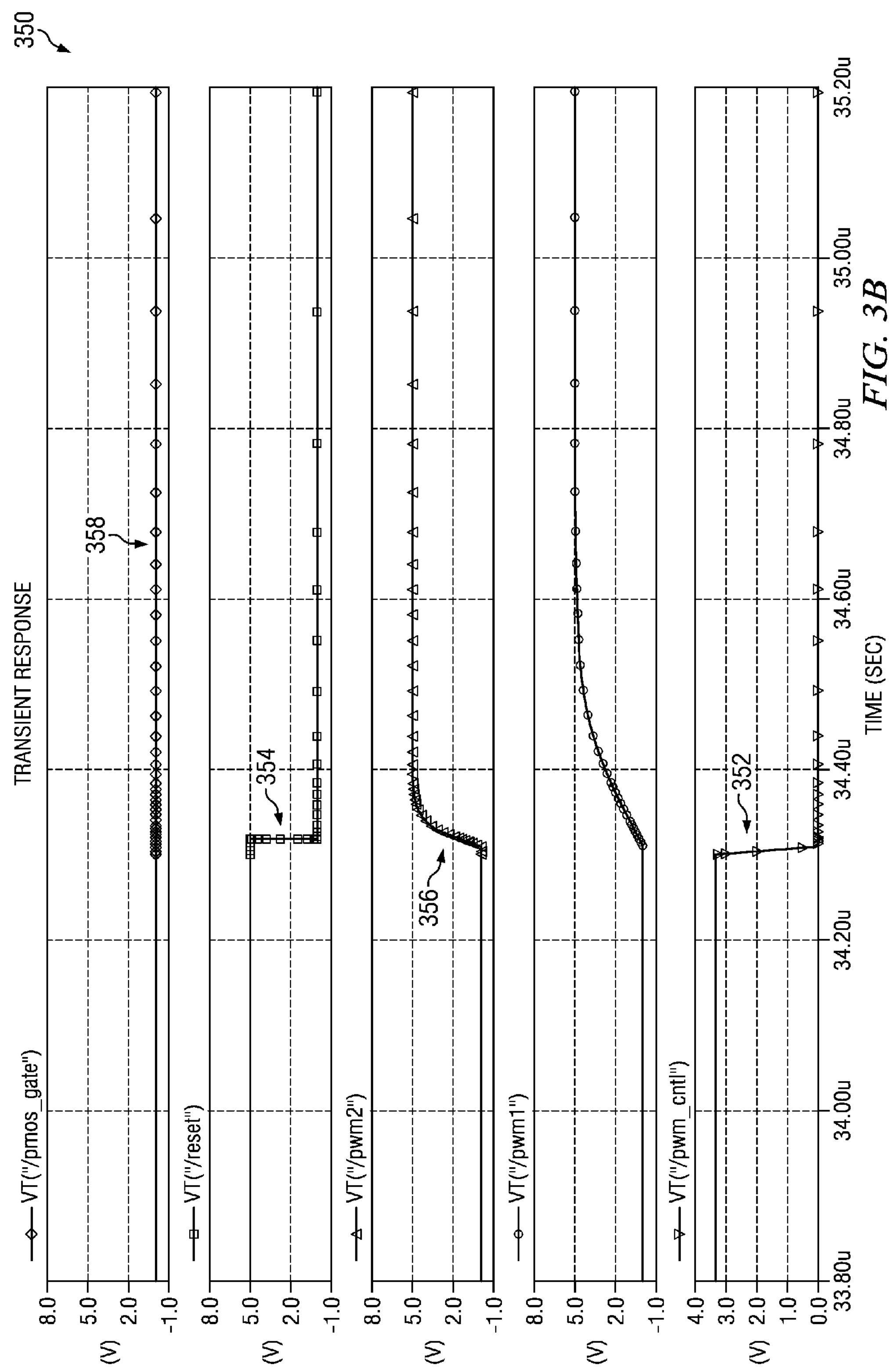
FIG. 3B is a graphical display illustrating how the output node varies because of for the first implementation of the APS for second and subsequent PWM rising edge.

FIG. 3B is a graphical display 350 illustrating how the output node varies because of for a first implementation of the APS 110 for second and subsequent PWM rising edge.

Figure 3C:
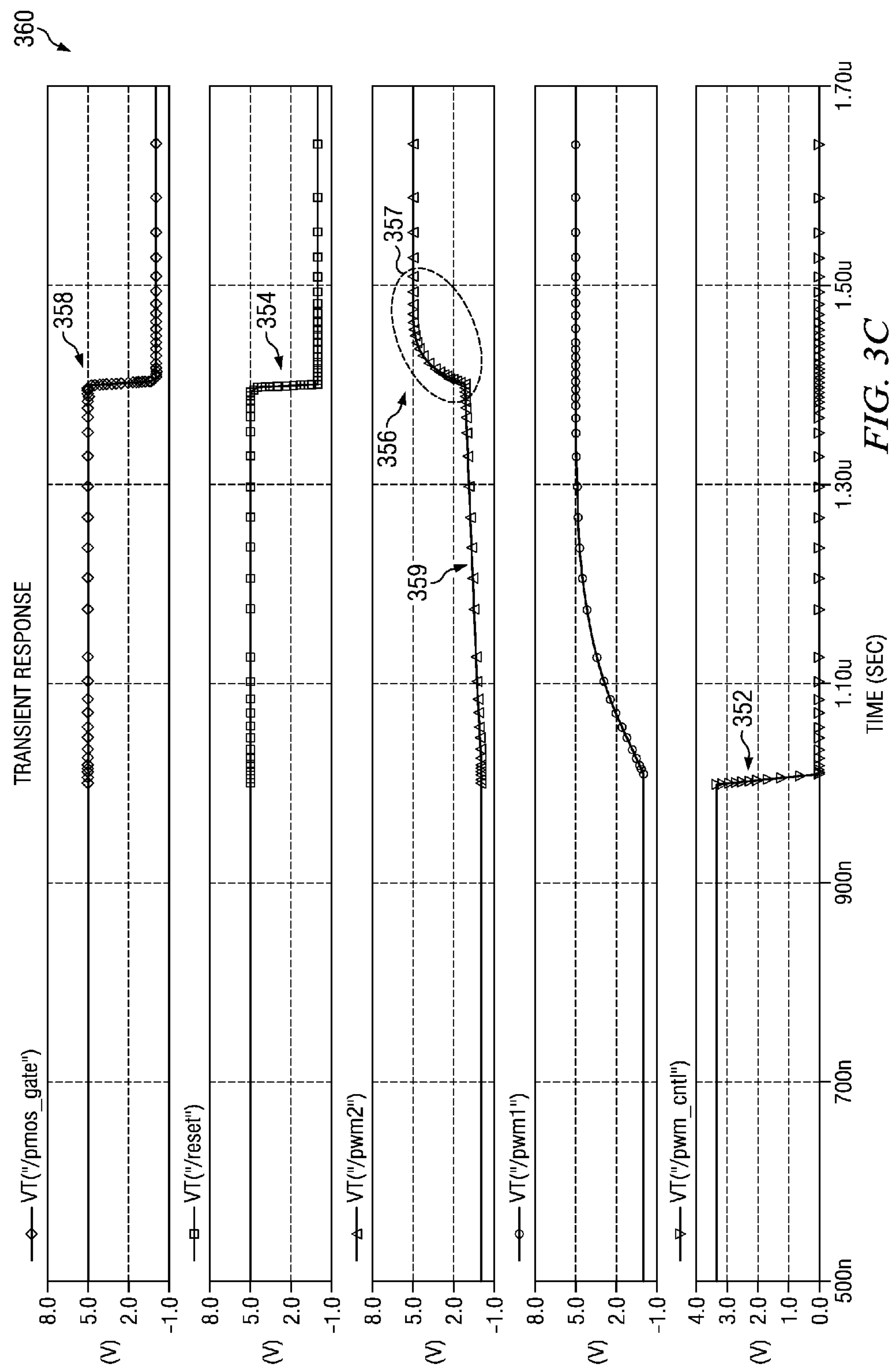
FIG. 3C is a graphical display illustrating how the output node varies because of for the first implementation of the APS for first PWM rising edge.

FIG. 3C is a graphical display 350 illustrating how the output node varies because of for a first implementation of the APS 110 for the first PWM rising edge. Plot 352 shows how the control signal for the device 315 transitions from low to high, which opens this device and stops pulling output node low. In response, the plot 354, which represents the comparator output signal that applied to the reset input of the latch 350, also transitioned from high to low. This changes the slew rate of the output node 320 and makes it rise much faster as illustrated in plot 356. Plot 358, the gate of the device 330 stays low throughout the active mode because of the latch's output.

Figure 4A:
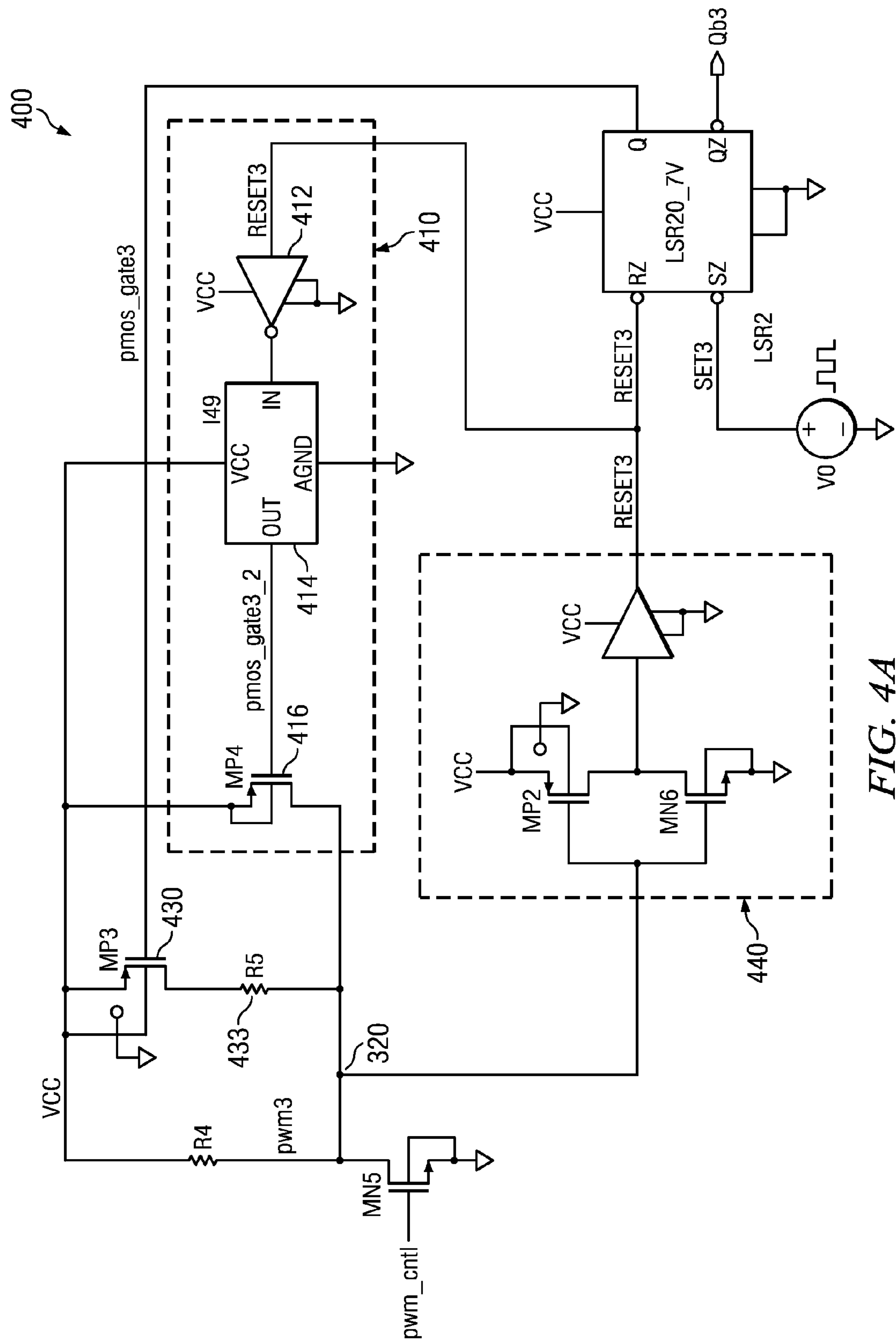
FIG. 4A is a circuit diagram for a second implementation of the APS.

FIG. 4A is a circuit diagram 400 of a second implementation of the APS 110 that includes a single pulse circuit 410. This circuit includes an inverter 412, a mono-shot generation circuit 414, and a switch 416. When the switch 416 closes, it also pulls the output node high. But the control for this switch comes from the output of the generation circuit 414, which may include logic gates, resistors and capacitors. The relation between this circuit's input terminal and its output terminal may be characterized by a threshold voltage(s) detection on PWM rising edge and a pulse generation to turn on PHOS 416. The input terminal for the generation circuit 414 is the output terminal of the inverter 412; but inverter's input: terminal is the comparator's output terminal. In operation, as indicated in FIG. 4B, Signal 468, the PWM has a much faster slew rate than the first implementation of Active Pull Up circuit.

With this implementation, the resistor 433 may be sized differently than the resistor 333. For example the resistor 433 may have a resistance of approximately 250 kΩ, 275 kΩ, or the like. Though the resistor 433 may be larger than the resistor 333, the APS 110 implemented by circuit diagram 400 still achieves a high rising slew rate and less current. consumption when the output node 320 switches. Having a larger resistance for the resistor 433 is beneficial because of smaller quiescent current consumption during active mode while PWM is low.

Figure 4B:
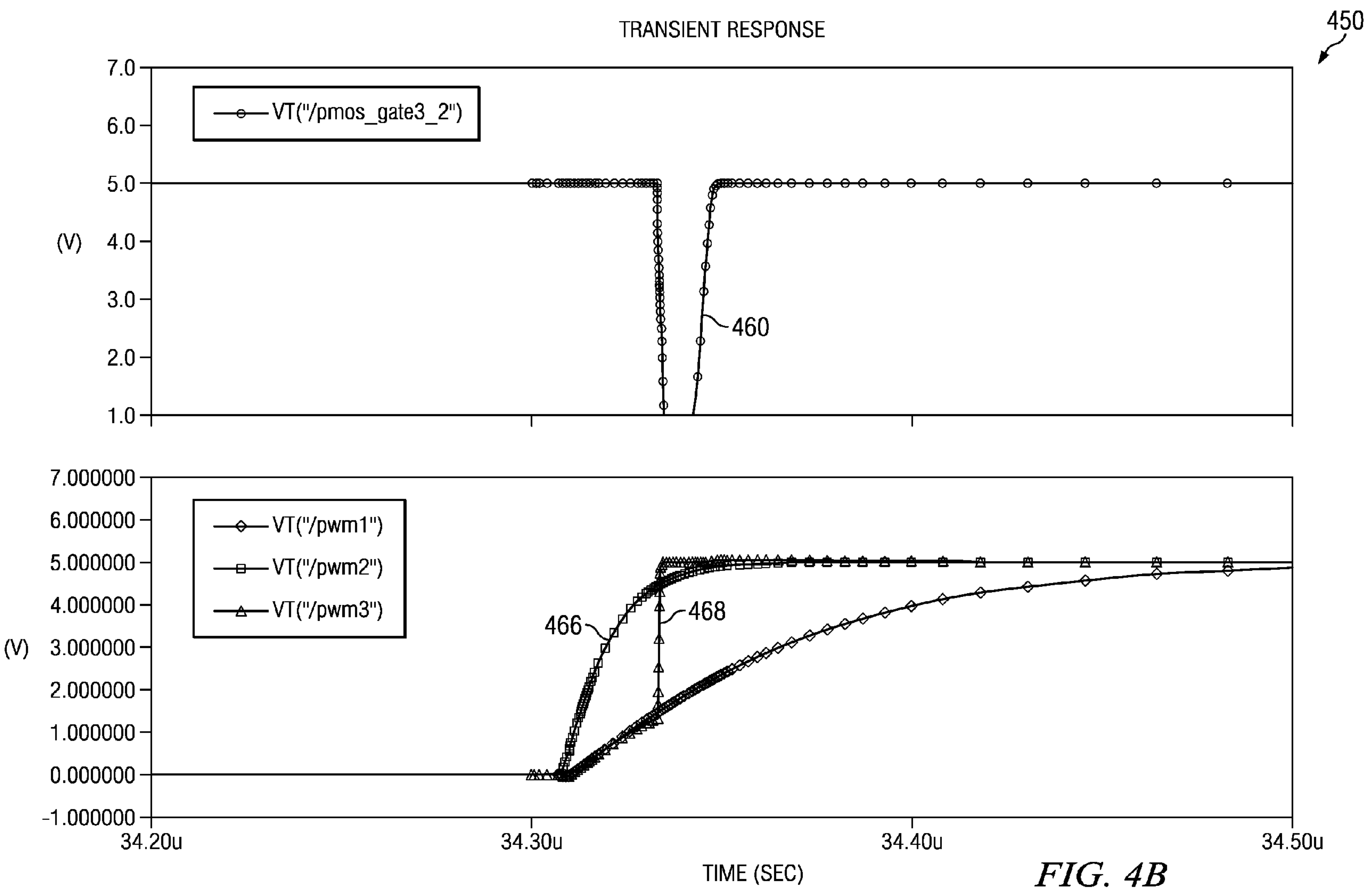
FIG. 4B is a graphical display illustrating how the output node varies because of for a second implementation of the APS.

FIG. 4B is a graphical display 450 illustrating how the output node varies because of for a second implementation of the APS 110. The plot 460 illustrates the output of the generation circuit 414. When the comparator 440 of FIG. 4A detects a low to high transition at the output node, this generation circuit: produces a small negative going pulse. The signal 466 illustrates how the output node 320 varies with the APS implementation shown in circuit diagram 300. In contrast, signal 468 illustrates how the Output node 320 varies with the APS implementation shown in circuit diagram 400. As indicated in the signal 468, the rising slew rate is changed significantly by single pulse circuit 410.

The APS 110 is applicable to a host of systems. One example may include pulse wave modulated (PWM) input for a motor driver. In addition, the APS 110 is applicable to any system where there is an open drain pull down. For example, the APS 110 is applicable to a general purpose, input-output pin (GPIO). Once the device is awake, the pin may be used for digital applications. Other applications may include using the APS 110 in conjunction with a pulse wave modulation (PWM) circuit. This PWM circuit: can control the speed of an associated motor, or device, by controlling the speed of a motor driver. Alternatively, the APS 110 may be used with a device that required a wake up function based on a low to high transition and subsequently can be used as a digital input pin.

While various embodiments of the active pull-up system have been described, it may be apparent to those of ordinary skill in the art that many more embodiments and implementations arc possible that are within the scope of this system.

Although certain aspects of the active pull-up system may be described in relation to specific techniques or structures, the teachings and principles of the present system arc not limited solely to such examples. All such modifications arc intended to be included within the scope of this disclosure and the present active pull-up system and protected by the following claim(s).

What is claimed is:

1. An active pull-up system comprising:

A. a first resistor connected between a supply voltage and an output node;

B. a first switch and a second resistor connected in parallel with the first resistor between the supply voltage and the output node, the first switch being in series with the second resistor, and the first switch having a control input;

C. a second switch connected between the output node and circuit ground and having a control input;

D. a latch having an input and having an output connected to the control input of the first switch; and E. a threshold comparator connected between the output node and the input of the latch.

2. The active pull-up system of claim 1 in which the threshold comparator includes at least one device selected from the group consisting of a p-type transistor, an n-type transistor, and an inverter.

3. The active pull-up system of claim 1 in which the threshold comparator includes a voltage comparator with sonic internal thresholds.

4. A fan control system for a motor including the active pull-up system of claim 1.

* * * * *